US011294578B2

(12) United States Patent
Matsugami et al.

(10) Patent No.: US 11,294,578 B2
(45) Date of Patent: *Apr. 5, 2022

(54) STORAGE SYSTEM AND CONTROL METHOD THEREOF

(71) Applicant: HITACHI, LTD., Tokyo (JP)

(72) Inventors: Kazuki Matsugami, Tokyo (JP); Yoshihiro Yoshii, Tokyo (JP); Nobumitsu Takaoka, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 58 days.

This patent is subject to a terminal disclaimer.

(21) Appl. No.: 16/860,237

(22) Filed: Apr. 28, 2020

(65) Prior Publication Data

US 2020/0257457 A1 Aug. 13, 2020

Related U.S. Application Data

(63) Continuation of application No. 16/117,330, filed on Aug. 30, 2018, now Pat. No. 10,656,849.

(30) Foreign Application Priority Data

Mar. 27, 2018 (JP) .............................. JP2018-60662

(51) Int. Cl.
  *G06F 3/06* (2006.01)
  *G06F 9/54* (2006.01)
  *G06F 12/0802* (2016.01)

(52) U.S. Cl.
  CPC .......... *G06F 3/0619* (2013.01); *G06F 3/0608* (2013.01); *G06F 3/0656* (2013.01);
  (Continued)

(58) Field of Classification Search
  CPC ............. G06F 12/0246; G06F 12/0802; G06F 12/0868; G06F 2212/1041;
  (Continued)

(56) References Cited

U.S. PATENT DOCUMENTS 10,656,849 B2 * 5/2020 Matsugami ........... G06F 3/0608
2004/0210713 A1 10/2004 Kanai
(Continued)

FOREIGN PATENT DOCUMENTS

JP 2005-157815 A 6/2005
JP 2010-224845 A 10/2010
(Continued)

OTHER PUBLICATIONS

Notice of Reasons for Refusal, dated Jun. 23, 2020, which issued during the prosecution of Japanese Application No. 2018-060662, which corresponds to the present application (English translation attached).

(Continued)

*Primary Examiner* — Zhuo H Li
(74) *Attorney, Agent, or Firm* — Baker Botts L.L.P.

(57) ABSTRACT

With omission of a duplication process of compressed data, a cache access frequency is reduced to improve throughput. A storage system includes first and second control units and a storage drive. Upon receiving a data write command, the first control unit stores data to be subjected to the write command in a first cache area of the first control unit, and stores the data in a second cache area of the second control unit to perform duplication, and upon completion of the duplication, the first control unit transmits a response indicating an end of write, performs a predetermined process on the data to be subjected to the write command, stores the data in a buffer area, reads the data stored in the buffer area, and transmits the read data to the storage drive.

12 Claims, 10 Drawing Sheets

(52) U.S. Cl.
CPC ............ *G06F 3/0689* (2013.01); *G06F 9/546* (2013.01); *G06F 12/0802* (2013.01)

(58) Field of Classification Search
CPC ......... G06F 2212/222; G06F 2212/285; G06F 2212/7203; G06F 3/0605; G06F 3/0608; G06F 3/0619; G06F 3/0656; G06F 3/0659; G06F 3/067; G06F 3/0689; G06F 9/546

See application file for complete search history.

(56) References Cited

U.S. PATENT DOCUMENTS

| | | |
|---|---|---|
| 2005/0114592 A1 | 5/2005 | Jin et al. |
| 2007/0255914 A1 | 11/2007 | Maki et al. |
| 2009/0055593 A1 | 2/2009 | Satoyama et al. |
| 2009/0144496 A1 | 6/2009 | Kawaguchi |
| 2012/0011318 A1 | 1/2012 | Hasegawa |
| 2015/0127854 A1 | 5/2015 | Yamamoto et al. |

FOREIGN PATENT DOCUMENTS

| | | |
|---|---|---|
| JP | 2016-510440 A | 4/2016 |
| WO | WO 2017/056219 A1 | 4/2017 |

OTHER PUBLICATIONS

Jun Kato et al., "High-speed writing in in-memory deduplication," Research report computer system symposium, Nov. 28, 2016, pp. 51-59 (Concise explanation is located in paragraphs [0004], [0005] and [0006] on pp. 2 and 3 of the Specification).

Notice of Reasons for Refusal, dated Oct. 19, 2021 for Japanese Application No. 2020-185556 (with English translation).

\* cited by examiner

FIG. 3
VOLUME MANAGEMENT TABLE
207

| VOL ID (41) | VOL ATTRIBUTE (42) | VOL CAPACITY (43) | POOL ID (44) |
|---|---|---|---|
| 0 | THIN PROVISIONING | 100GB | 0 |
| 10 | COMPRESSION ENABLED | 200GB | 0 |
| 20 | NORMAL VOL | 500GB | 1 |
| ... | ... | ... | ... |

FIG. 4
POOL CONFIGURATION MANAGEMENT TABLE
208

| POOL ID (51) | RAID GROUP ID (52) | POOL CAPACITY (53) | POOL USE CAPACITY (54) |
|---|---|---|---|
| 0 | 0<br>1 | 10TB | 5TB |
| ... | ... | ... | ... |

FIG. 5
RAID CONFIGURATION MANAGEMENT TABLE
209

| RAID GROUP ID (61) | RAID LEVEL (62) | DRIVE ID (63) | DRIVE TYPE (64) | CAPACITY (65) | USE CAPACITY (66) |
|---|---|---|---|---|---|
| 0 | RAID5 | 0<br>1<br>2<br>3 | HDD | 5TB | 3TB |
| ... | ... | ... | ... | ... | ... |

FIG. 6

POOL ALLOCATION MANAGEMENT TABLE
210

| VOL ID ⌒71 | VOL ADDRESS ⌒72 | POOL ID ⌒73 | POOL ADDRESS ⌒74 | SIZE BEFORE COMPRESSION ⌒75 | SIZE AFTER COMPRESSION ⌒76 | COMPRESSION RATE ⌒77 |
|---|---|---|---|---|---|---|
| 0 | 100 | 0 | 10 | 8KB | 4KB | 1/2 |
| 0 | 200 | 0 | 10000 | 8KB | 2KB | 1/4 |
| ... | ... | ... | ... | ... | ... | ... |

FIG. 7

DRIVE ALLOCATION MANAGEMENT TABLE
211

| POOL ID ⌒81 | POOL ADDRESS ⌒82 | RAID GROUP ID ⌒83 | DRIVE ID ⌒84 | DRIVE ADDRESS ⌒85 |
|---|---|---|---|---|
| 0 | 10 | 0 | 0 | 100 |
| 0 | 10000 | 1 | 5 | 1000 |
| ... | ... | ... | ... | ... |

MEMORY ALLOCATION MANAGEMENT TABLE 212

| VOL ID (91) | VOL ADDRESS (92) | BF ADDRESS (93) | VOL ADDRESS AFTER COMPRESSION (94) | QUEUE STATE (95) | BF TRANSFER STATE (96) |
|---|---|---|---|---|---|
| 0 | 100 | – | – | DIRTY | NONE |
| 0 | 200 | 50 | 1200 | DIRTY | TRANSFERRED |
| 0 | 300 | – | 1500 | DIRTY | NONE |
| 0 | 400 | – | 1000 | CLEAN | TRANSFERRED |
| ... | ... | ... | ... | ... | ... |

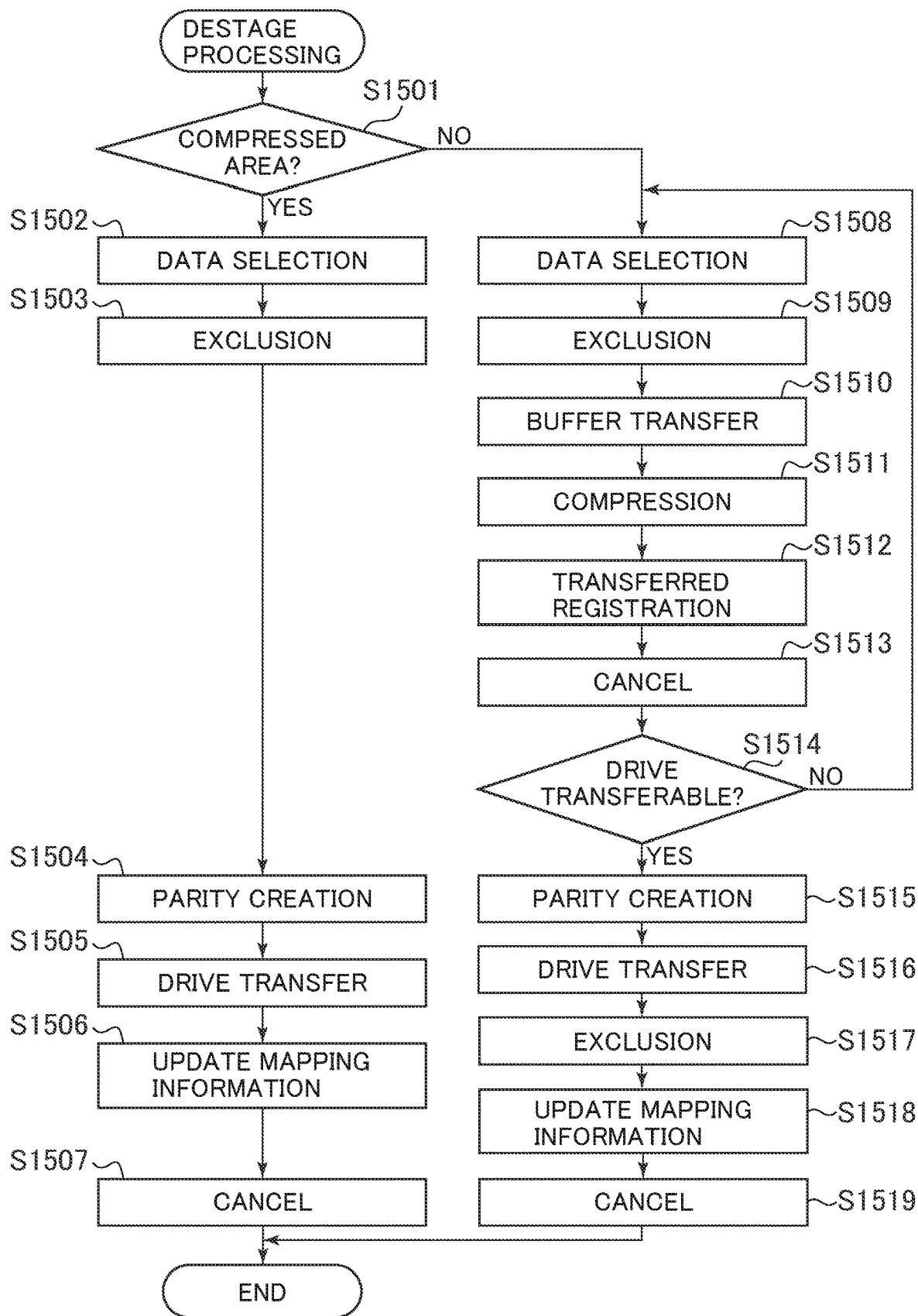

STORAGE SYSTEM AND CONTROL METHOD THEREOF

CLAIM OF PRIORITY

The present application is a continuation of U.S. patent application Ser. No. 16/117,330 filed on Aug. 30, 2018, which claims priority from Japanese patent application JP 2018-60662 filed on Mar. 27, 2018, the content of which is hereby incorporated by reference into this application.

BACKGROUND

The present invention relates to a storage system.

In general, a storage system includes one or more storage devices. Each of one or more storage devices generally includes, for example, an HDD (hard disk drive) or an SSD (solid state drive) as the storage device. The storage system is accessed from one or more host devices (for example, host computers) through a network such as a SAN (storage area network) or LAN (local area network). In general, the storage device improves reliability with the use of a high reliability method complying with a RAID (redundant array of independent (or inexpensive) disks) technique.

U. S. Patent Application Publication No. 2009/0144496 discloses an information system capable of compressing data while maintaining a data writing speed from a host computer. According to U.S. Patent Application Publication No. 2009/0144496, the storage device provides a first volume that accepts data write from a host computer and a second volume that compresses and manages data on the first volume. Upon completion of the data write to the first volume from the host computer, the storage device returns a response assuming that a write process to the host computer is completed. Thereafter, the storage device compresses the data asynchronously with the data write from the host computer and stores the compressed data in the second volume.

A publication "Jun Kato, Hirok Otsuji, Kosuke Suzuki, Mitsuru Sato, Eiji Yoshida: "High-speed writing in in-memory deduplication", Research report computer system symposium, Nov. 28, 2016, pp. 51-59" discloses a method for achieving both of a response and a throughput by switching a processing opportunity according to an operation rate of a storage device, in a deduplication process for combining duplicate data written from a host computer into one piece.

For example, the "High-speed writing in in-memory deduplication" discloses that "This paper proposes a hybrid method in which characteristics related to an IOPS and a latency depend on different methods, and those methods are selectively used, to thereby realize a low latency of a duty-back method and a high IOPS of a dedup-through method." In addition, the "High-speed writing in in-memory deduplication" discloses that "This paper proposes a hybrid method in which two methods of a conventional dedup-through method for performing deduplication synchronously and a dedup-back method for performing deduplication asynchronously are compared with each other, a high IOPS performance and a high latency by overhead of a synchronous deduplication process in the dedup-through method, and a low latency and a reduction in IOPS caused by an increase in a tail latency in the dedup-back method are clarified, to thereby aim at performing both of the high IOPS and the low latency by combination of those two methods."

In other words, according to the "High-speed writing in in-memory deduplication", when the operation rate of the storage device is low, a response time is shortened by performing the deduplication process after the data write from the host computer is completed, and when the operation rate is high, the deduplication process is performed simultaneously with the data write.

SUMMARY

In order to protect data according to a RAID technology in data write, there is a need to collect the amount of data (parity cycle) necessary for redundancy. Since data protection on a cache memory is necessary until data for a parity cycle is collected, the data on the cache memory is duplexed. The same is performed on as well data written from the host computer and compressed data. In such a case, a maximum speed of data write is limited by data read and the amount of cache access by duplication.

As a method of reducing the cache access amount, there is conceivable a method of omitting a process of duplexing pre-compressed data by compressing the data in synchronization with write. However, in order to return a response to a process completion to the host computer, since the compressed data needs to be duplexed, a response speed is delayed by a time required for the compression process.

The above problem is not limited to the storage system having a compression function but may be caused by a storage system having other data amount reduction functions such as deduplication and a storage system performing encryption or redundancy or the like.

A representative example of the present invention for solving at least one of the above problems is as follows. In other words, there is provided a storage system that includes a first storage control unit, a second storage control unit, and a storage drive connected to at least the first storage control unit and having a nonvolatile storage medium, wherein each of the first storage control unit and the second storage control unit includes a cache area in which data is stored and a buffer area in which the data is stored, and the data stored in one cache area is stored in the other cache area to perform duplication, upon receiving a data write command from a host computer, the first storage control unit stores data to be subjected to the write command in a first cache area which is the cache area of the first storage control unit, and stores the data in a second cache area which is the cache area of the second storage control unit to perform duplication, and upon completion of the duplication, the first storage control unit transmits a response indicating an end of the write of the data to the host computer, executes a predetermined process on the data to be subjected to the write command, stores the data in the buffer area, reads the data stored in the buffer area, and transmits the read data to the storage drive.

According to an aspect of the present invention, the duplication process of compressed data is omitted by collectively performing processing from the compression process to storage in the storage device. Since the duplication of the compressed data becomes unnecessary, the cache access amount can be reduced and the maximum speed of the data write can be improved. In addition, the pre-compressed data is held in the cache memory until the storage of the compressed data in the storage device is completed, thereby being capable of protecting data even if a device failure occurs during processing such as the compression process or the storage in the storage device.

The problems, configurations, and advantages other than those described above will become apparent by a description of embodiments described below.

BRIEF DESCRIPTION OF THE DRAWINGS

FIG. 3 is an illustrative view showing a configuration example of a VOL management table held by the storage device according to the first embodiment of the present invention;

FIG. 4 is an illustrative view showing a configuration example of a pool configuration management table held by the storage device according to the first embodiment of the present invention;

FIG. 5 is an illustrative view showing a configuration example of a RAID configuration management table held by the storage device according to the first embodiment of the present invention;

FIG. 6 is an illustrative view showing a configuration example of a pool allocation management table held by the storage device according to the first embodiment of the present invention;

FIG. 7 is an illustrative view showing a configuration example of a drive allocation management table held by the storage device according to the first embodiment of the present invention;

FIG. 14 is a flowchart showing a destage process in which an exclusion procedure is changed, to be executed by the storage device according to the first embodiment of the present invention.

DETAILED DESCRIPTION

Figure 1:
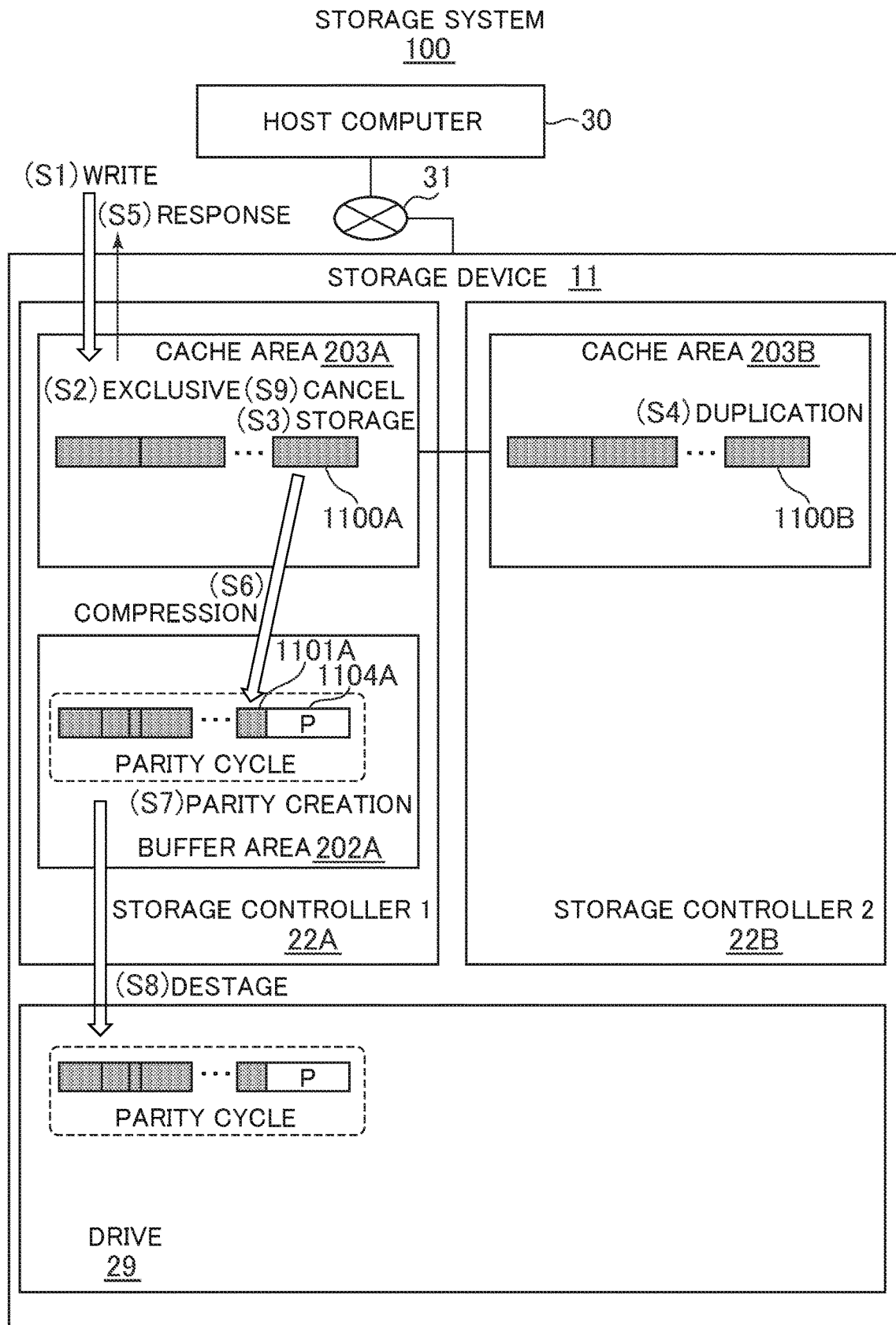
FIG. 1 is an illustrative view showing a data write procedure with a data compression process to be executed by a storage system according to a first embodiment of the present invention.

In the following description, an "interface unit" may include at least one of a user interface unit and a communication interface unit. The user interface unit may include at least one I/O device of one or more I/O devices (for example, an input device (for example, a keyboard and a pointing device) and an output device (for example, display device)) and a display computer. The communication interface unit may include one or more communication interface devices. The one or more communication interfaces may be one or more communication interface devices (for example, one or more NIC (network interface adapter)) of the same type, or may be two or more communication interface devices (for example, NIC and HBA (host bus adapter)) of different types.

Further, in the following description, a "memory unit" includes one or more memories. At least one memory may be a volatile memory or a nonvolatile memory. The memory unit is mainly used for processing by the processor unit.

Also, in the following description, a term "processor unit" includes one or more processors. Typically, at least one processor is a CPU (central processing unit). The processor may include a hardware circuit that performs some or all of the processing.

In addition, in the following description, information may be described in terms of an expression such as "xxx table", but the information may be represented by any data structure. In other words, in order that information does not depend on the data structure, the "xxx table" can be referred to as "xxx information." In the following description, the configuration of each table is an example. One table may be divided into two or more tables, and ail or some of two or more tables may be one table.

In addition, in the following description, in the case of describing elements of the same type without any distinction, a common code among the reference symbols is used, and when the elements of the same type are distinguished from each other, reference symbols (or element ID (for example, identification) may be used. For example, when multiple storage controllers are not distinguished from each other, the storage controllers are described as "storage controllers 22", and when the storage controllers are distinguished from each other, the storage controllers may be described, for example, as "storage controller 1_22A", "storage controller 2-22B." The same is applied to the other elements (for example, a cache area 203, a buffer area 202, addresses 1100, 1101, 1104, and so on).

In the following description, a "storage system" includes one or more storage devices. At least one storage device may be a general-purpose physical computer. At least one storage device may be a virtual storage device or may executes SDx (software-defined anything). The Sax may be configured by, for example, an SDS (software defined storage) (an example of a virtual storage device) or an SDRC (software-defined datacenter).

Hereinafter, embodiments of the present invention will be described with reference to the accompanying drawings.

First Embodiment

Hereinafter, a first embodiment of the present invention will be described.

<Storage Procedure of Compressed Data in Storage Device>

FIG. 1 is an illustrative view showing a data write procedure involving a data compression process to be executed by a storage system 100 according to the first embodiment of the present invention.

The storage system 100 includes a host computer 30 and a storage device 11. The host computer 30 is connected to the storage device 11 through a network 31 and managed by a management computer (not shown). The storage device 11 includes one or more volumes (logical storage areas). The host computer 30 may be a physical computer or a virtual computer to be executed by a physical computer. The host computer 30 may be a virtual computer to be executed by the storage system.

Data is written to a storage controller 122A or a storage controller 2_22B of the storage device 11 from the host computer 30. A write process of data accompanied by a compression process from the host computer 30 in the storage system 100 will be described.

The present embodiment shows a case in which the storage controller 1_22A receives a write command from the host computer 30.

A specific example will be described below.

(S1) The storage device 11 receives a write command from the host computer 30 through the network 31. The write command includes data and an allocation destination address 1100 of the data. When receiving the write command, a write process of S2 and the subsequent steps starts.

(S2) In response to the write command, the storage device 11 secures the exclusion of a slot indicated by an allocation destination address 1100. With the above configuration, the data in the slot is prevented from being updated according to another write command. The "slot" Is an area in a volume (VOL). Specifically, the slot of the present embodiment is an area serving as a unit of management of whether write to the drive 29 has been performed or not, and whether transfer to the buffer area 202 has been performed or not. In the embodiment, the area is referred to as "slot", but it may be called with other name.

The "securing the exclusion of the slot" is the operation of preventing read and write with respect to the slot indicated by an address designated by the read command and the write command from the host computer 30, and information for the host computer 30 to recognize that the exclusion is secured is managed. The type of the information does not matter if a bit map or time information can be identified. In addition, in the present embodiment, the "slot" is an area in a VOL (for example, TP-VOL that is VOL according to thin provisioning), whereas the "data area" is an area allocated to the slot (for example, a pool area which is an area in the pool).

(S3) In a cache area 203A in a storage controller 1_22A of the storage device 11, data is stored at an address 1100A corresponding to the data allocation destination address 1100.

(S4) The storage controller 1_22A transfers the data stored in the cache area 203A to the storage controller 222B. The storage controller 2_22B stores the data received at the address 1100B in the cache area 203B corresponding to the allocation destination address 1100 and returns a response to the storage controller 1_22A, thereby completing duplication in the storage device 11.

(S5) After completion of the duplication, the storage device 11 responds a write completion to the host computer 30 through the network 31. At that point, the host computer 30 recognizes that the write is completed.

(S6) The storage controller 1_22A selects the data to be written to the drive from the cache area 203A, compresses the selected data, and stores the compressed data at the address 1101A in the buffer area 202A. This processing is executed until the amount of data for the parity cycle is accumulated in the buffer area 202A.

Further, as will be described later, the storage controller 1_22A may directly store the selected data at the address 1101A without compression of the data, or may perform processing other than compression (for example, deduplication or encryption), and store the processed data at the address 1101A.

(S7) When the amount of data in the buffer area 202A reaches the parity cycle, the storage controller 1_22A generates the parity data from the stored data and stores the generated parity data at an address 1104A in the buffer area 202A.

(S8) The storage controller 1_22A writes the compressed data and parity data in the buffer area 202A to the drive 29 (destage process).

(S9) Upon completion of the destage process, the storage controller 1_22A cancels the exclusion of the slot secured In (S2).

An example of the write process is described above.

<Storage Device>

Figure 2:
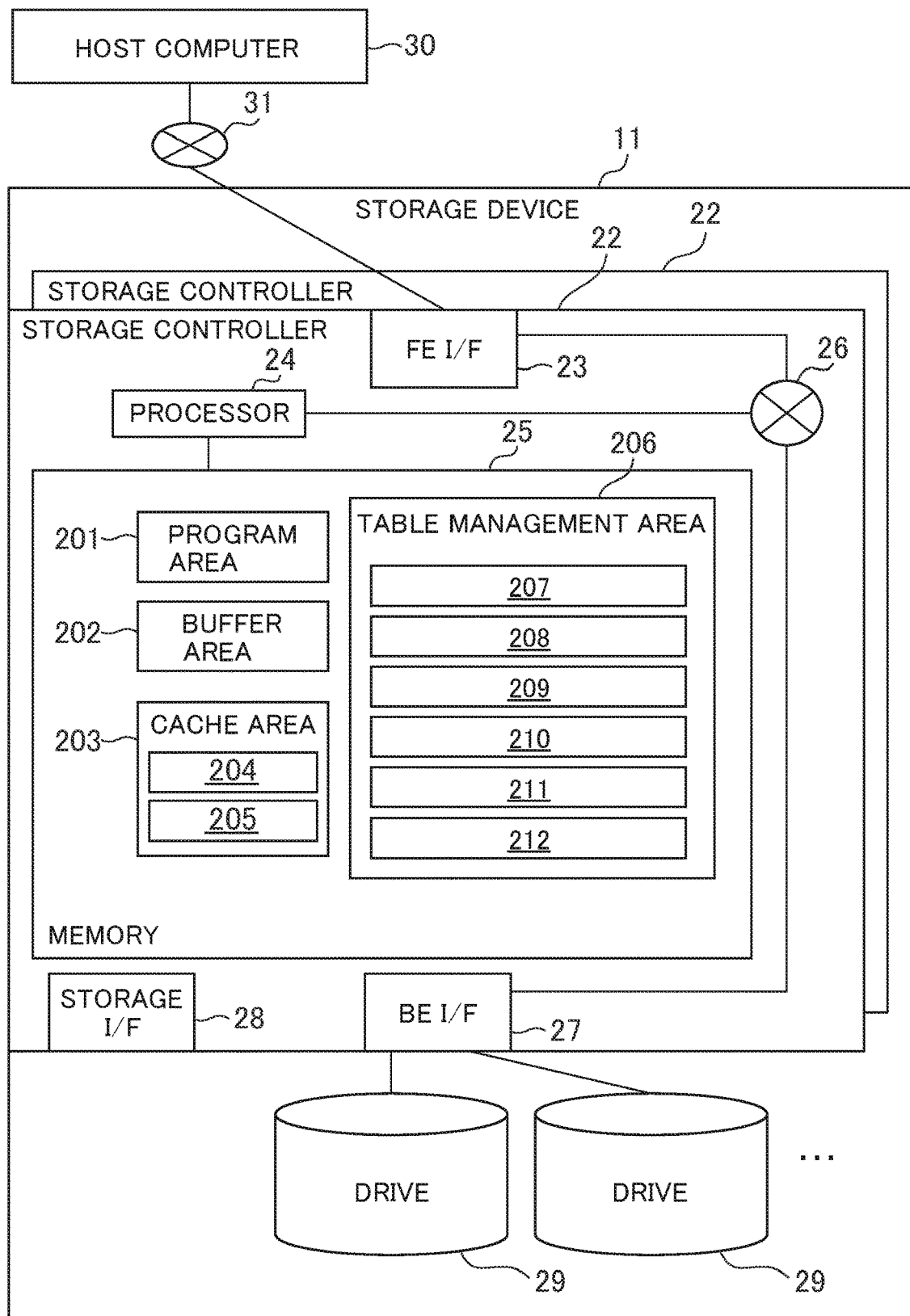
FIG. 2 is a block diagram showing a configuration of a storage device according to the first embodiment of the present invention.

FIG. 2 is a block diagram showing a configuration of the storage device 11 according to the first embodiment of the present invention.

The storage device includes one or more storage controllers 22 and multiple drives 29 that are connected to the one or more storage controllers 22.

The storage controller 22 includes an FE_I/F (front end interface device) 23 that communicates with the host computer 30, a storage I/F (storage interface device) 28 that communicates between the storage devices, and a processor 24 that controls the entire device, a memory 25 that stores programs and information used by the processor 24, BE_I/F (back end interface device) 27 that communicates with the drives 29, and an internal network 26 that connects those components to each other.

The memory 25 includes a program area 201 that manages the programs, a buffer area 202 which is a temporary storage area for data transfer and copying, write data (data written in response to a write command) from the host computer 30, a cache area 203 that temporarily stores read data (data read in response to a read command) from the drive 29, and a table management area 206 that stores various tables.

The cache area. 203 has an uncompressed data storage area 204 for temporarily storing write data from the host computer 30 and a compressed data storage area 205 for storing the compressed data. A table management area 206 stores a VOL management table 207 that holds information on a VOL, a pool configuration management table 208 that holds information on a pool, a RAID configuration management table 209 that holds information on the RAID configuration, a pool allocation management table 210 that holds information on pool allocation, a drive allocation management table 211 that holds information on drive allocation, and a memory allocation management table 212 that holds information on memory allocation.

The drive 29 is a device having a nonvolatile data storage medium and may be, for example, an SSD (solid state drive) or an HDD (hard disk drive). The multiple drives 29 may store multiple RAID groups (also called parity groups). Each RAID group is configured by one or more drives 29.

The FE_I/F 23, the BE_I/F 27, and the storage I/F 28 are examples of an interface unit. The memory 25 is an example of a memory unit. The processor 24 is an example of a processor unit.

<VOL Management Table>

FIG. 3 is an illustrative view showing a configuration example of the VOL management table 207 held by the storage device 11 according to the first embodiment of the present invention.

The VOL management table 207 has an entry for each VOL. Each entry stores information such as a VOL_ID 41, a VOL attribute 42, a VOL capacity 43 and a pool ID 44. Hereinafter, one VOL ("target VOL" in the description of FIG. 3) will be exemplified.

The VOL_ID 41 is an ID of the target VOL. The VOL attribute 42 indicates an attribute of the target VOL (for example, whether the target VOL is a VOL to which thin provisioning is applied or a normal VOL, whether the compression is enabled or not, and so on). The VOL capacity 43 indicates a capacity of the target VOL. The pool ID 44 is an ID of the pool associated with the target VOL.

In the destage process, the processor 24 can determine whether the VOL requires data compression or not, by referring to the VOL attribute 42 of the VOL management table 207. For example, if the VOL attribute 42 is "compression enabled", the processor 24 performs data compression process.

<Configuration Management Table>

FIG. 4 is an illustrative view showing a configuration example of the pool configuration management table 208 held by the storage device 11 according to the first embodiment of the present invention.

The pool is a logical storage area configured based on one or more RAID groups. The pool configuration management table 208 has entries for each pool. Each entry includes a pool ID 51, a RAID group ID 52, a pool capacity 53, and a pool use capacity 54. Hereinafter, one pool ("target pool" in the illustration of FIG. 4) will be exemplified.

The pool ID 51 is an ID of the target pool. The RAID group ID 52 is an ID of each of the one or more RAID groups on which the target pool is based. The pool capacity 53 indicates a capacity of the target pool. The pool use capacity 54 indicates a total amount of the area allocated to the VOL in a pool capacity of the target pool.

FIG. 5 is an illustrative view showing a configuration example of the RAID configuration management table 209 held by the storage device 11 according to the first embodiment of the present invention.

The RAID configuration management table 209 has an entry for each RAID group. Each entry stores information such as a RAID group ID 61, a RAID level 62, a drive ID 63, a drive type 64, a capacity 65, and a use capacity 66. Hereinafter, one RAID group ("target RAID group" in the illustration of FIG. 5) will be exemplified.

The RAID group ID 61 is an ID of the target RAID group. The RAID ID 62 indicates the type of a RAID algorithm applied to the target RAID group. The drive ID 63 is an ID of each of the one or more drives configuring the target RAID group. The drive type 64 indicates the type (for example, HDD or SSD) of the drive configuring the target RAID group. The capacity 65 indicates a capacity of the target RAID group. The use capacity 66 indicates the capacity that is being used in the capacity of the target RAID group.

<Allocation Management Table>

FIG. 6 is an illustrative view showing a configuration example of a pool allocation management table 210 held by the storage device 11 according to the first embodiment of the present invention.

The pool allocation management table 210 has an entry for each VOL address (address indicating a slot in the VOL). Each entry stores information such as a VOL_ID 71, a VOL address 72, a pool ID 73, a pool address 74, a pre-compression size 75, a post-compression size 76, and compression rate 77. Hereinafter, one VOL address ("target VOL address" in the illustration of FIG. 6) will be exemplified.

The VOL_ID 71 is an ID of the VOL to which the slot identified by the target VOL address belongs. The VOL address 72 is a target VOL address. The pool ID 73 is an ID of the pool including a data area allocated to the target VOL address. The pool address 74 is an address (belonging to the pool) of the data area allocated to the target VOL address. The pre-compression size 75 indicates the size before compression of the data according to the write command designating the target pool address. The post-compression size 76 indicates the size after compression of the data according to the write instruction designating the target pool address. The compression rate 77 is a value of the post-compression size 76 to the pre-compression size 75.

FIG. 7 is an illustrative view showing a configuration example of the drive allocation management table 211 held by the storage device 11 according to the first embodiment of the present invention.

The drive allocation management table 211 has an entry for each pool address. Each entry stores information such as a pool ID 61, a pool address 82, a RAID group ID 83, a drive ID 84, and a drive address 85. Hereinafter, one pool address ("target pool address" in the illustration of FIG. 7) will be exemplified.

The pool ID 81 is an ID of the pool to which the target pool address belongs. The pool address 82 is a target pool address. The RAID group ID 83 is an ID of the RAID group which is the basis of a data area indicated by the target pool address. The drive ID 84 is an ID of the drive which is the basis of the data area indicated by the target pool address. The drive address 85 is a drive address corresponding to the target pool address.

<Logical Storage Hierarchy>

Figure 8:
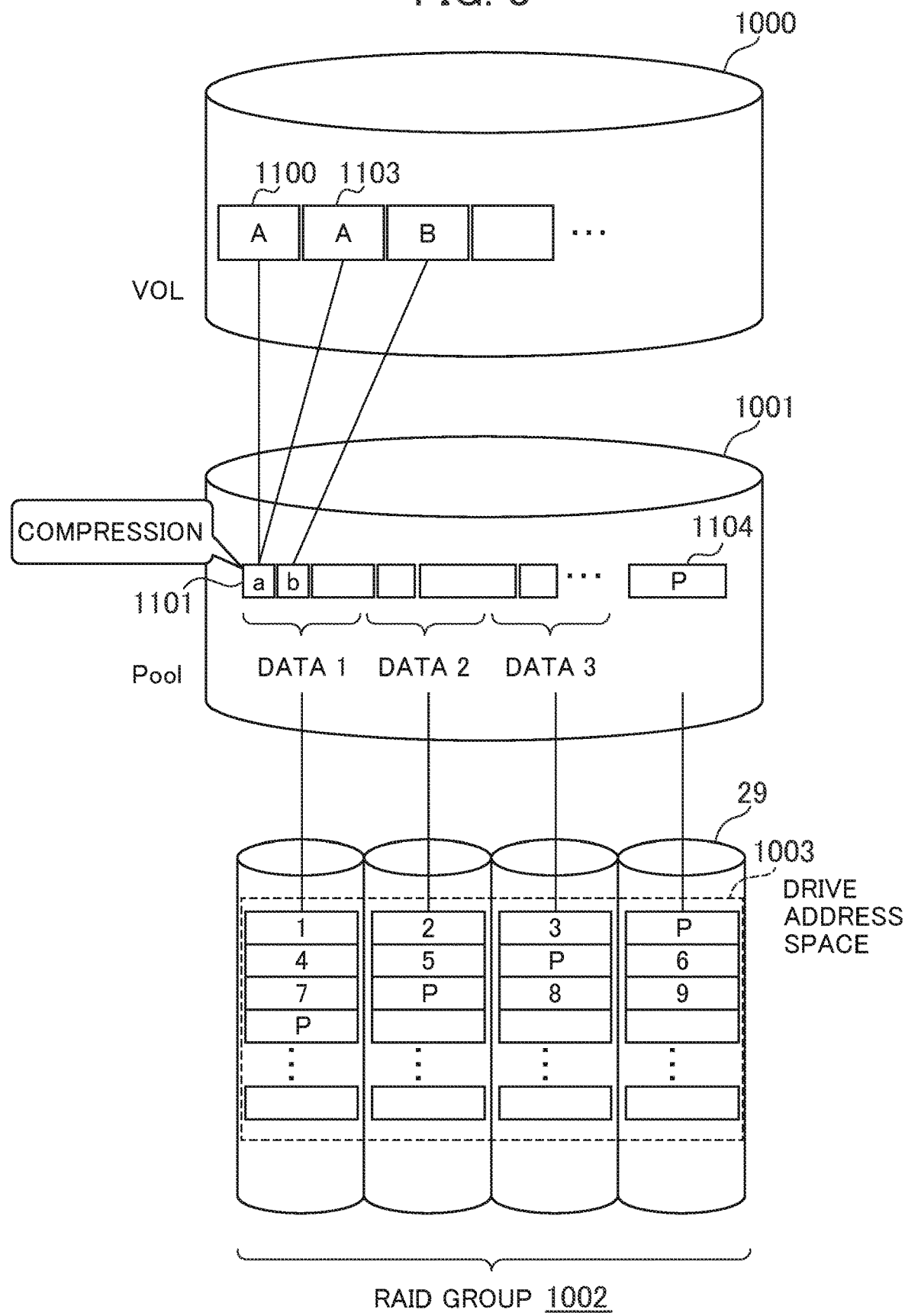
FIG. 8 is an illustrative view showing a configuration example of a logical storage hierarchy managed by the storage device according to the first embodiment of the present invention.

FIG. 8 is an illustrative view showing a configuration example of a logical storage hierarchy managed by the storage device 11 according to the first embodiment of the present invention.

The VOL 1000 is provided to the host computer 30. In addition, there are cases where one pool address s pointed out from multiple slots in the VOL 1000 by copy processing or a deduplication process, and one pool address is indicated from the multiple VOL slots. In an example of FIG. 8, two different slots (VOL addresses) 1100 and 1103 indicate the same pool address 1101. The allocation of the pool 1001 from the VOL 1000 is based on the pool allocation management table 210. Allocation from the pool 1001 to the drive address space 1003 (that is, multiple drive address spaces provided by the multiple drives 29 configuring the RAID group 1002) is managed based on the drive allocation management table 211.

<Memory Allocation Management Table>

Figures 9, 10:
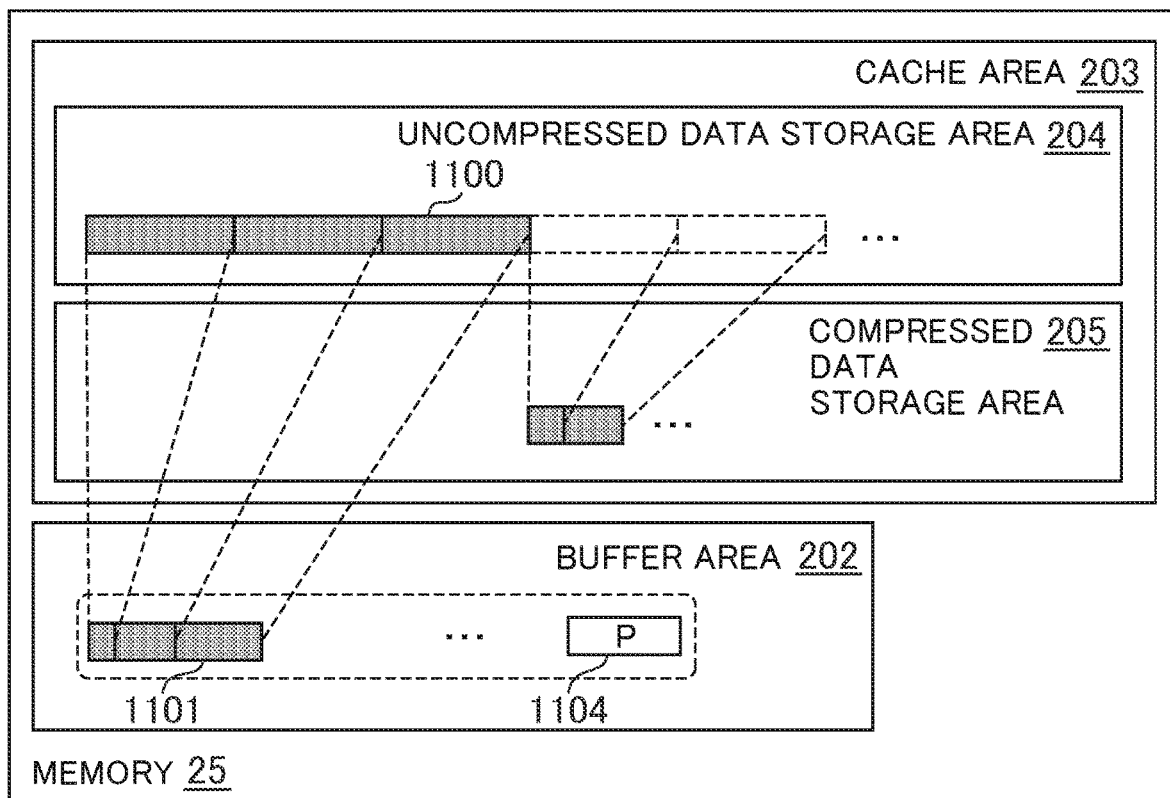
FIG. 9 is an illustrative view showing a configuration example of a memory allocation management table held by the storage device according to the first embodiment of the present invention.
FIG. 10 is a diagram showing a configuration example of memory allocation in the storage device according to the first embodiment of the present invention.

FIG. 9 is an illustrative view showing a configuration example of the memory allocation management table 212 held by the storage device 11 according to the first embodiment of the present invention.

The memory allocation management table 212 has an entry for each VOL address (address indicating a slot). Each entry stores a VOL_ID 91, a VOL address 92, a buffer (BF) address 93, a post-compression VOL address 94, a queue state 95, and a BE transfer State 96. Hereinafter, one VOL address ("target VOL address" in the illustration of FIG. 9) will be exemplified.

The VOL_ID 91 is an ID of the VOL to which the slot identified by the target VOL address belongs. The VOL address 92 is a target VOL address. The BF address 93 is a transfer destination BF of the data written by designation of the target VOL address. The post-compression VOL address 94 indicates a transfer destination VOL address of the data which has been excluded from being transferred to the BF among the data written by designation of the target. VOL address. The queue state 95 indicates whether the storage of the data written by designation of the target VOL address in the drive 29 has been completed. In FIG. 9, "Dirty" of the value of the queue state 95 indicates that the storage in the drive 29 cannot be performed, and "Clean" indicates that the storage in the drive 29 has been completed. The BF transfer state 96 indicates whether or not the data written by designation of the target VOL address has been compressed and transferred to the BF. When the transfer to the BF has been completed, a value of the BF transfer state 96 is "transferred", and when the transfer is not performed, the value is "none".

FIG. 10 is a diagram showing a configuration example of the memory allocation in the storage device 11 according to the first embodiment of the present invention.

The cache area 203 provides the uncompressed data storage area 204 which is a virtual address space corresponding to the VOL and the compressed data storage area 205 corresponding to the pool address to the storage controller 22. The uncompressed data storage area 204 corresponding to the VOL address is allocated according to the write command from the host computer 30 to the controller 22. When the storage controller 22 compresses the data asynchronously with the write command, the storage controller 22 stores the compressed data the buffer area 202 or in the compressed data storage area 205 in the cache area 203, in association with the pool address.

In an example of FIG. 10, the slot 1100 in the VOL in which the written data is stored points to the area 1101 in the buffer area 202 corresponding to the pool address. The allocation of the VOL address and the pool address are managed by the pool allocation management table 210. The allocation to the buffer area 202 is managed by the BF address 93 of the memory allocation management table 212, and the allocation to the compressed data storage area, is managed by the post-compression VOL address 94 of the memory allocation management table 212.

In the buffer area 202, when the amount of data in the buffer area reaches the size of the parity cycle, a parity 1104 not corresponding to the uncompressed data storage area 204 is generated through the processor 24.

An example of processing to be performed in the present embodiment will be described below.

<Read Process>

Figure 11:
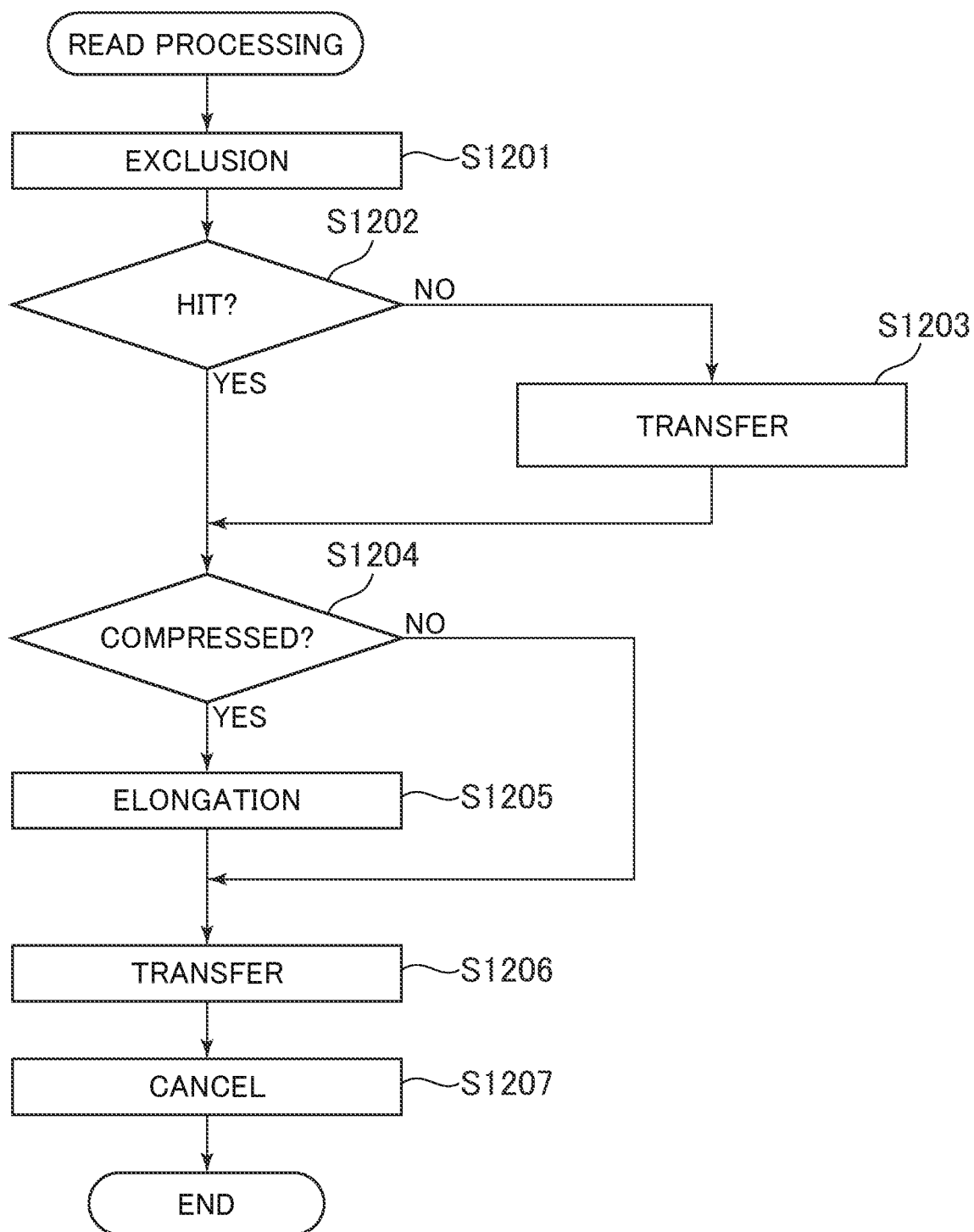
FIG. 11 is a flowchart showing a read process to be executed by the storage device according to the first embodiment of the present invention.

FIG. 11 is a flowchart showing the read process to be executed by the storage device 11 according to the first embodiment of the present invention.

The read process starts when the storage device receives the read command from the host computer 30 through the network 31. In the read command, for example, a virtual ID (for example, virtual VOL_ID), an address, and a data size are designated.

In S1201, the processor 24 secures the exclusion of the slot specified from the read command. If the other processing secures the exclusion of the slot at the time of securing the slot exclusion, the processor 24 waits for a certain period of time, and then performs S1201.

In S1202, the processor 24 determines whether the read data is present in the cache area 203 or not. If the determination result in S1202 is true, the process proceeds to S1204. If the determination result in S1202 is false, the processor 24 transfers the read data from the RAID group to the buffer area 202. At that time, the processor 24 specifies the pool ID 73, the pool address 74, and the post-compression size 76 of the pool allocation management table 210 from the VOL_ID and VOL address designated by the host computer 30, and specifies a storage location of the data and a data size with reference to the drive ID 84 and the drive address 85 from the drive allocation management table 211.

In S1204, the processor 24 determines whether the read data in the buffer area 202 has been compressed or not, according to the compressed size 76. If the read data is compressed data, the processor 24 decompresses the data in S1205, and if the read data is not compressed data, the processor 24 skips S1205.

In S1206, the processor 24 transfers the read data in the buffer area 202 to the host computer 30. The host computer 30 recognizes that the read process has been completed at the time of completion of the data transfer in S1206.

Thereafter, the processor 24 cancels the secured slot exclusion in S1205.

<Write Process>

Figure 12:
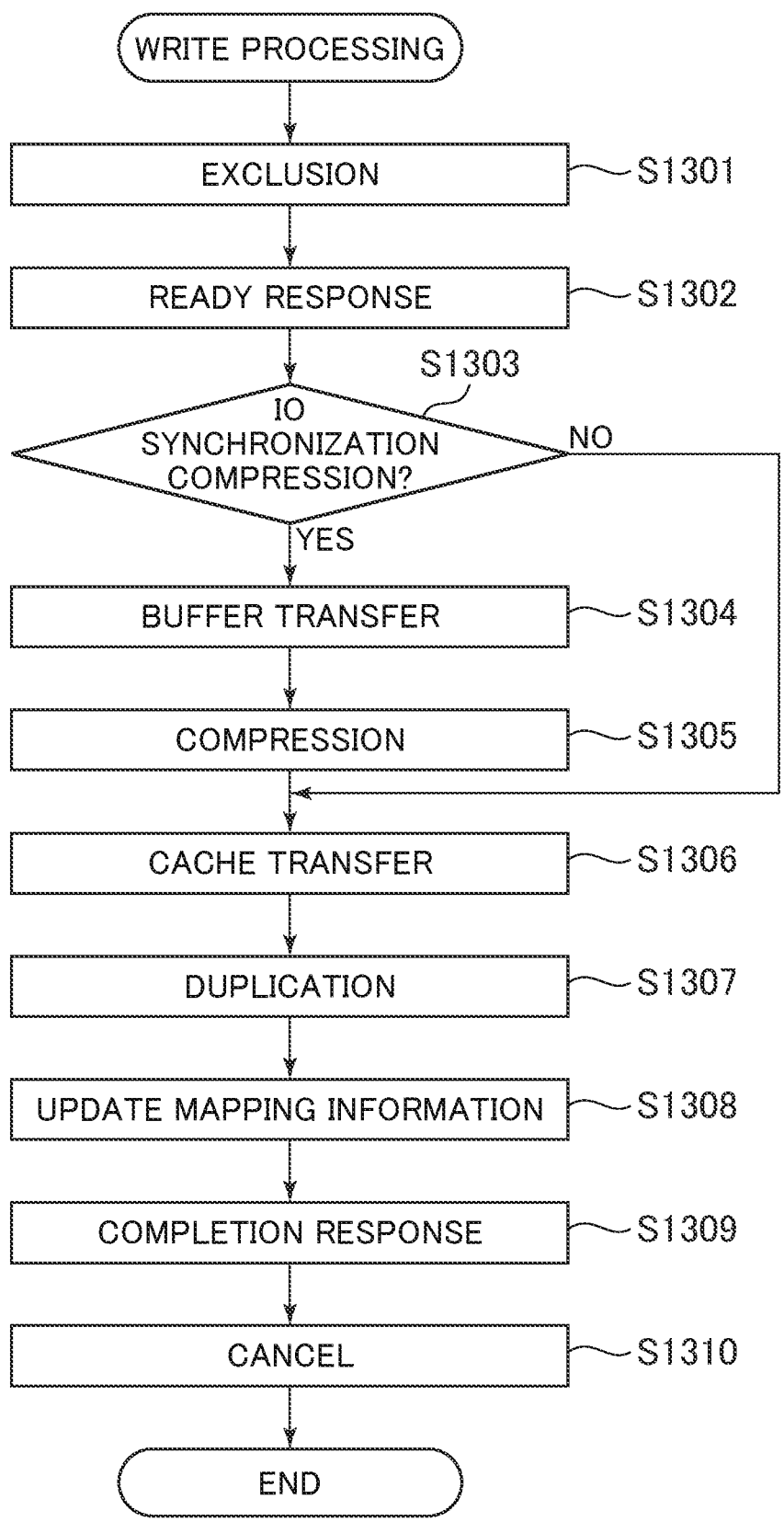
FIG. 12 is a flowchart showing a write process to be executed by the storage device according to the first embodiment of the present invention.

FIG. 12 is a flowchart showing the write process to be executed by the storage device 11 according to the first embodiment of the present invention.

The write process starts when the storage device 11 receives the write command from the host computer 30. In the following description, the processors 24 belonging to the storage controller 2_22A and the storage controller 222B are distinguished from each other by "A" and "B" attached to reference numerals, for example, the processor 24 of the storage controller 222A is described as a processor 24A.

An allocation destination address is attached to the write command from the host computer 30. The storage device 11 secures the exclusion of the slot indicated by the allocation destination address in S1301. At the same time as securing the slot exclusion, the processor 24A allocates the slot area of the cache area 203A as the data write destination.

In S1302 the processor 24A responds "Ready" indicating that the write process has been prepared for the host computer 30. The processor 24A receives the write data from the host computer 30 that has received "Ready". Thereafter, in S1303, the processor 24 determines whether there is a need to execute the compression process in synchronization with the write command or not. Incidentally, the storage system 100 branches to a case 1 which gives priority to a response performance or a case 2 which gives priority to a throughput performance according to a load of the processor 24A, the write amount to the storage device 11, and a data length of the write data. For example, when the storage device 11 holds the following conditions and the processor 24A receives the write command, the storage device 11 may determine which of the response performance and the throughput performance is to be prioritized, based on the held conditions.

<Case 1> Response Priority

There are the following conditions for giving priority to the response performance. For example, it may be determined whether the response performance is prioritized or not, based on only one of the following plural conditions or a combination of the plural conditions. The same is applied to the conditions concerning the throughput performance to be described later.

(1) The load of the storage controller 22 (that is, the processor 24) is lower than a predetermined reference.

(2) It is expected that a compression rate when the write data is compressed becomes lower than the predetermined reference.

(3) The compressed data cannot be stored in the write destination volume.

In the above item (1), since a variation of the load becomes unstable when the determination result frequently switches in the vicinity of the predetermined reference, the reference may be changed in multiple stages in order to prevent the unstable variation. In addition, the above item 1) may be determined based on, for example, the amount of the I/O command to the storage device 11. For example, when the number of I/O commands per unit time or the amount of data to be written and read by the IO command is less than a predetermined reference, it may be determined that the load is low.

In the above item (2), for example, when the size of the write data is smaller than the predetermined reference, it may be determined that the compression rate of the write data is low, that is, a reduction in data due to the compression is not expected. In the above item (3), for example, when the VOL attribute 42 of the VOL management table 207 corresponding to the VOL to which the write data is written is not "compression enabled", it may be determined that the compressed data cannot be stored in the write destination volume.

For example, in the case where the processor 24A has a low load and gives priority to the response performance, the determination of S1303 is false. In that case, the processor 24A stores the write data received in S1306 into the cache area 203A to which the received write data is allocated. In S1307, the processor 24A transfers the write data stored in the cache area 203A from the storage controller 1_22A to the storage controller 222B and store the write data in the cache area 203B to perform duplication.

In S1308, the processor 24A updates the memory allocation management table 212. In this case, the write data is not yet compressed. For that reason, the values of the BF address 93 corresponding to the VOL address of the slot allocated as the data write destination and the post-compression VOL address 94 are not present, and the processor 24A updates the queue state 95 to "Dirty".

Next, in S1309, a completion response is returned from the storage device 11 to the host computer 30 through the network 31 as the completion of the write process. When the completion response is returned. The storage device 11 cancels the secured exclusion of slot and completes the write process in S1310.

<Case 2> Throughput Priority

There are the following conditions for giving priority to the throughput performance.

(4) A load of the storage controller 22 (that is, the processor 24) is higher than a predetermined reference.
(5) It is expected that the compression rate when the write data is compressed becomes higher than the predetermined reference.

As in the above item (1), the above item (4) can be determined, for example, based on the amount of the I/O command to the storage device 11. For example, when the number of I/O commands per unit time or the like is more than the predetermined reference, it may be determined that the load is high.

In the above item (5), for example, when the size of the write data is larger than the predetermined reference, it may be determined that the compression rate of the write data is high, that is, the data reduction by compression is expected.

For example, in the case where the processor 24 has a high load and gives priority to the throughput performance, the determination of S1303 is true. In that case, the processor 24A transfers the write data received in S1309 to the buffer area 202A. Next in S1305, the processor 24A compresses the data in the buffer.

In S1304 and S1305, compression may be performed when the write data is stored in the buffer area 202A (in other words, the compression may be performed before storage in the buffer area 202A, and the compressed data may be stored in the buffer area 202A), or the compression may be performed in the buffer area 202A after storage in the buffer area 202A. In either case, ultimately, the compressed data is stored in the buffer area 202A.

Further, the compression may be performed in a store area (for example, a memory in the processor 24A) other than the buffer area 202A.

In this example, the compression is an example of a predetermined process performed on the write data. The processor 24 performs processing other than the compression, for example, deduplication, encryption, redundancy, or the like, and stores the processed data. In the buffer area 202A. The same is applied to S1411 FIG. 14 to be described later.

Next, in S1306, the processor 24A stores the compressed data in the buffer area 202A in the allocated cache area 203A. In S1307, the processor 24A transfers the write data stored in the cache area 203A from the storage controller 1_22A to the storage controller 2_22B, and stores the transferred write data in the cache area 203B for duplication of the compressed data.

In S1308, the processor 24A updates the memory allocation management table 212. In that case, the write data is compressed and an address is allocated to the compressed data. For that reason, the post-compressed VOL address 94 corresponding to the VOL address of the slot allocated as the write destination of data is updated. In addition, there is no value of the EP address 93, and the processor 24A updates the queue state 95 to "Dirty".

Next, in S1309, the completion response is returned from the storage device 11 to the host computer 30 through the network 31 as the completion of the write process. Upon returning the completion response, the storage apparatus 11 cancels the secured exclusion of the slot and completes the write process in S1310.

<Destage Process>

Figure 13:
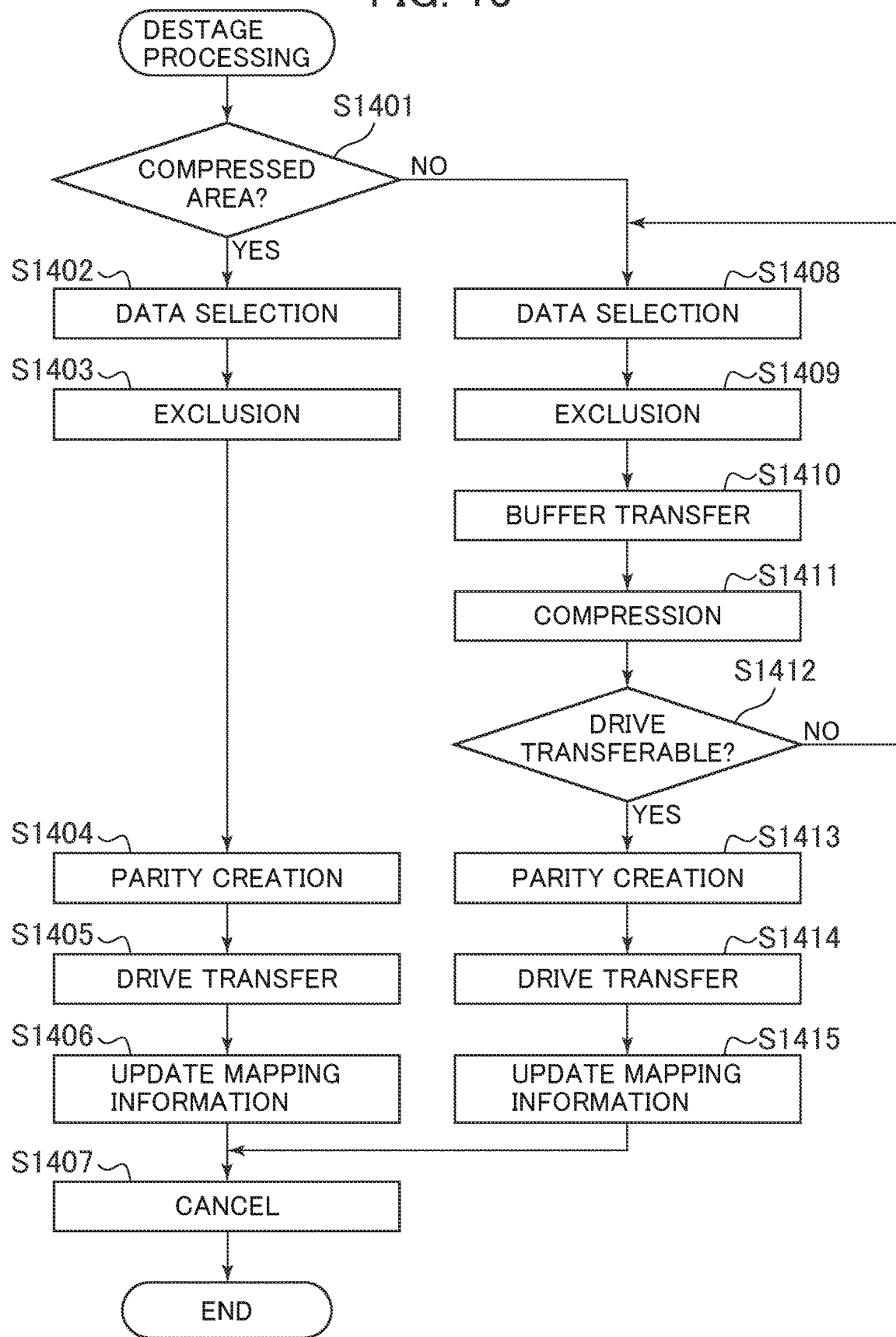
FIG. 13 is a flowchart showing a destage process to be executed by the storage device according to the first embodiment of the present invention.

FIG. 13 is a flowchart showing the destage process to be executed by the storage apparatus 11 according to the first embodiment of the present invention.

The destage process is performed asynchronously after the write command from the host computer 30 to the storage device 11 has been completed. Meanwhile, the destage may be started with the completion of the write command as a trigger, or may be started periodically. Alternatively, the amount of write may be determined and selected according to the consumed amount of the cache area 203 or the like.

When the destage process is started, the storage device 11 determines whether or not a target area of the destage process belongs to the compressed data storage area 205 on the cache area, in S1401. If the determination is true (in other words, if the target area belongs to the compressed data storage area 205), the processing of a case 2-1 is executed. If the determination is false (in other words, if the target area belongs to the uncompressed data storage area 204), the processing of a case 1-1 is executed.

<Case 2-1> Destage of Compressed Data

When the determination in S1401 is true, the destage process (S1402 to S1406) is performed on the compressed data storage area 205 in the cache area 203. In S1402, the processor 24A selects the data to be subjected to the destage process from the compressed data storage area 205. Normally, a data string (stripe string) in which data for the parity cycle is aligned is selected, and destaging is performed on the data string.

In S1403, the processor 24 secures the exclusion of the slot to which the destaging data belongs. After securing the exclusion, the processor 24A generates the parity data from the target data string in S1404. In S1405, the processor 24A writes the target data string and the generated parity data in the drive. In S1406, the processor 24A updates the memory allocation management table 212. In this case, the queue state 95 is updated to "Clean." In S1407, the processor 24A cancels the exclusion of the slot in a destaged range and completes the process.

<Case 1-1> Compression and Destage Batch Process (Exclusion is Held During Destage)

If the determination in S1401 is false, the destage process (S1408 to S1415) is performed on the uncompressed data storage area 204 in the cache area 203. In S1408, the processor 24A selects data to be subjected to the destage process from the data belonging to the slot whose queue state 95 is "dirty" among the data stored in the uncompressed data storage area 204. Normally, a data string (stripe string) in which data for the parity cycle is aligned is selected, and destaging is performed on the selected data string.

In S1409, the processor 24 secures the exclusion of the slot to which the data to be destaged belongs. Incidentally, when the destage process shown in FIG. 13 is executed when the write process shown in FIG. 12 is completed (that is, immediately after the write process) as a trigger, S1310 and S1409 may be omitted.

After securing the exclusion, the processor 24A reads out the target data in S1410 and transfers the read data to the buffer area 202. At the time of transfer, the processor 24 allocates the BF address 93 and the post-compression VOL address 94 in the memory allocation management table 212. The processor 24A updates the BF transfer state 96 to "transferred" after the completion of transfer to the buffer area 202. Since it is apparent that the allocation of the post-compression VOL address 94 is performed for the parity cycle, the area for the parity cycle is allocated in advance, thereby being capable of reducing the number of updates of mapping information.

In S1411, the processor 24A compresses the transferred data. The compression process may be performed during buffer transfer (that is, compression may be performed before storage in the buffer area 202 and the compressed data may be stored in the buffer area 202), or may be performed in the buffer after the transfer.

In S1412, the processor 24A determines the amount of compressed data in the buffer. If the amount of compressed data is smaller than the parity cycle amount, the processor 24 additionally selects data to be destaged by returning to S1408. If the data for the parity cycle is accumulated in the buffer area 202, the determination in S1412 is true, and the process proceeds to S1413. Since the compressed data size is variable in length, the data in the buffer area 202 is not always provided for the parity cycle. However, the process may proceed to S1413 before the data exceeds the parity cycle.

In S1413, the processor 24A generates the parity data from the compressed data in the buffer area 202. In S1414, the processor 24A writes the target data string and the generated parity data to the drives 29 configuring the RAID group. In S1415, the processor 24A confirms the update of the memory allocation management table 212. In this case, the queue state 95 is updated to "Clean." In S1407, the processor 24A cancels the exclusion of the slot in the destaged range and completes the processing.

In the above example, it is determined in S1412 whether or not the amount of compressed data in the buffer has reached the data amount of the parity cycle. However, when a predetermined amount of data is collectively stored in the drive 29 regardless of whether the drive 29 configures the RAID or not, the processor 24A determines in S1412 whether the amount of compressed data in the buffer has reached the predetermined amount or not. In S1412 of the present embodiment, the data amount of the parity cycle is an example of the predetermined data amount.

Even if the determination in S1401 is false, the processor 24A may execute S1402 to S1406 instead of S1408 to S1415 in some cases. If the determination in S1303 in FIG. 12 is false because the VOL attribute 42 of the write destination of the write data is not compression enabled, the uncompressed data is stored in the cache area 203A. In that case, the determination in S1401 is false, but since the data is not compressed, S1402 to S1406 are executed.

In the above example, when the throughput performance is prioritized, a response is returned to the host computer 30 at the time when the compressed data is duplicated in the cache area 203 during the write process, and the data compression is not necessary in the destage process is a result, although the response performance decreases, the throughput performance improves because the cache access during the destage process is reduced. The above process is an example, and when the throughput performance is prioritized, more processing may be performed during the write processing.

For example, when the determination in S1303 (FIG. 12) is true, the processor 24A may execute S1304 to S1308, subsequently execute the same processing as S1412, S1404 to S1406 (FIG. 13), and then execute in S1309 and S1310. In other words, since the compression process and the destage are performed on the write command all at once, the response performance further decreases, but the throughput performance improves.

Similarly, in this case, the processing when the determination in S1303 (FIG. 12) is false is described above with reference to FIGS. 12 and 13. In other words, the processor 24A does not execute S1304 to S1305, but execute S1306 to S1310. Further, the processor 24A executes S1408 to S1415 and S1407.

According to the above example, when the destage is started, the exclusion of the slot is secured (S1409). Thereafter, the transfer of the data to the drive 29 is completed (S1414), and the exclusion of the slot is secured (S1407) until the mapping information is updated (S1415). In this way, with the exclusion secured for a long period of time, a trouble such as impossibility of executing a necessary IO command may be generated. In order to avoid such a trouble, the following case 1-2 will be described as an example in which the exclusion procedure in the case 1-1 is changed.

FIG. 14 is a flowchart showing the destage process in which the exclusion procedure has been changed, to be executed by the storage device 11 according to the first embodiment of the present invention.

<Case 1-2> Compression and Destage Batch Processing (Exclusive Cancel During Destage)

In S1501, the storage device 11 makes the same determination as that of S1401 in FIG. 13. If the determination in S1501 is true, the destaging process (S1502 to S1507) is performed on the compressed data storage area 205 in the cache area 203. Those processes are the same as S1402 to S1407 in FIG. 13, and therefore a description of those processes will be omitted.

If the determination in S1501 is false, the destage process is performed on the uncompressed data storage area 204 in the cache area 203 (S1508 to S1519). In S1508, the processor 24 selects the data to be subjected to the destage process from the data belonging to the slop whose queue state 95 is "dirty" among the data stored in the uncompressed data storage area 204. Usually, the data string (stripe string) in which data for the parity cycle is aligned is selected, and destage is carried out on the selected data string.

In the case 1-1 described above, the slot range to be destaged is held until the destage process is completed. However, if the compressed data sire continues to hold the exclusion in a wide range where the compressed data size reaches the parity cycle, there is a high possibility of occurrence of a destage wait due to the occurrence of the write command from the computer 30 in the exclusion range. After the processor 24 secures the exclusion of the slot to which the data to be destaged belongs in S1509, the processor 24 the buffer transfer in S1501 and the compression process in S1511. The processor 24 updates the BF transfer state 96 of the memory allocation management table 212 to "transferred" in S1512 after the compression process has been completed. When the update is completed, the processor 24 cancels the slot exclusion in S1513.

Thereafter, the processor 24 performs the determination of whether the drive transfer is performed in S1514, the parity generation in S1515, and the drive transfer in S1516 in the same manner as in S1412, S1413, and S1414 of the case 1-1.

In S1517, the processor 24 secures the slot exclusion in the destage range again, and updates the queue state 95 in the memory allocation management table 212 to "Clean" in S1518.

In the meantime, when an update write from the host computer 30 occurs in the slot in the above destage range in a period up to S1517, the processor 24 updates the BF transfer state 96 of the memory allocation management table 212 to "none" in S1308. In this case, it can be noticed that an update write has occurred by determining that the BF transfer state 96 has switched when the processor 24 updates the queue state 95 in S1518.

If the occurrence of the update write has been noticed (that is, the BF transfer state 96 updated to "transferred" in S1512 has been "none" in S1517), the processor 24 retries the processing or skips the mapping information update of a target location. Specifically, the processor 24 may return to S1508 without going to S1518, and retry the destage process targeting the slot in which the update writing has been performed. Alternatively, the processor may go to S1508 as it is, and go to S1519 without updating the queue state 95 of a slot in which the update write has been performed to "Clean". In that case, the slot is to be subjected to the next destage process.

Finally in S1519, the processor 24 cancels the exclusion of the slot in the destaged range, and completes the processing.

According to the embodiment of the present invention described above, when the data stored in the cache area is destaged, the process from the compression process to the storage in the storage device (drive) is performed all at once, whereby the duplication process of the compressed data is omitted. Since duplication of the compressed data in the cache area is unnecessary, the cache access amount can be reduced and a maximum speed of data write can be improved.

Further, the data before compression is duplicated and held in the cache memory until the storage of the compressed data in the storage device is completed, as a result of which even if a device failure occurs during processing such as the compression process or storage in the storage device, the data can be protected. Even when the storage device performs processing other than compression (for example, deduplication, encryption, redundancy, or the like), the same advantages are obtained.

In addition, when the compression process is performed at the time of destaging, since, for example, an area having a predetermined size such as the parity cycle can be allocated in advance, the number of times of updating the mapping information can be reduced.

In addition, according to the embodiment of the present invention, the storage device determines which of the response performance and the throughput performance is to be given priority, based on a predetermined condition. In the case of prioritizing the response performance, the storage device responds to the host computer when the pre-compression data is duplicated and held in the cache memory. This improves the response performance. On the other hand, if priority is given to the throughput performance, compression is performed, and the storage device responds to the host computer when the data after compression is duplicated and held. This reduces the response performance, but reduces the amount of cache access during destage, thus improving the throughput performance.

For example, it is determined whether to give priority to the response performance or the throughput performance based on the amount of the IO command, the expected compression rate, the attribute of the write destination volume, or the like, thereby being capable of realizing the optimum performance according to the situation.

In addition, when destaging data before compression stored in the cache area, the storage of compressed data in the storage device from the time of reading the data from the cache area may be completed and the exclusion of the data area may be secured until the queue state is changed to "Clean" (S1409 to S1415, S1407). As a result, the data which has not yet been destaged is prevented from being erroneously determined to have been destaged.

Alternatively, the data may be read out, compressed, and exclusive may be temporarily canceled at the time of transfer to the buffer area (S1513). As a result, a trouble that a time for securing the exclusion is reduced and the necessary I/O cannot be executed is reduced. In that case, when new write is performed between temporary cancellation of the exclusion (S1513) and transfer of the data to the storage device (S1516), this fact is recorded (that is, the BF transfer state is updated from "transferred" to "none"). As a result, the data that has not yet been destaged is prevented from being erroneously determined to have been destaged.

The present invention is not limited to the above-described embodiments, but includes various modifications. For example, the above embodiments have been described in detail for better understanding of the present invention, but are not limited to the provision of all of the descriptive configurations.

Also, some or all of the above-described respective configurations, functions, processors, processing means may be realized with hardware, for example, by designed with an integrated circuit. Also, the above respective configurations and functions may realized with software by allowing the processor to interpret and execute programs for realizing the respective functions. The information on the program, table, and file for realizing the respective functions can be stored in a storage device such as a nonvolatile semiconductor memory, a hard disk drive, or an SSD (solid state drive), or a computer readable non-transitory tangible storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

What is claimed is:

1. A storage system comprising:
a first storage control unit;
a second storage control unit; and
a storage drive connected to at least the first storage control unit and having a nonvolatile storage medium,
wherein each of the first storage control unit and the second storage control unit includes a cache area in which data is stored and a buffer area in which the data is stored, and the data stored in one cache area is stored in the other cache area to perform duplication,
upon receiving a data write command from a host computer, the first storage control unit stores data to be subjected to the write command in a first cache area which is the cache area of the first storage control unit, and stores the data in a second cache area which is the cache area of the second storage control unit to perform duplication, and upon completion of the duplication, the first storage control unit transmits a response indicating an end of write of the data to the host computer,
the first storage control unit executes a predetermined process on the data to be subjected to the write command and transmits the data to the storage drive,
the first storage control unit holds a predetermined condition for determining which of a response performance and a throughput performance is prioritized in the storage system and determines which of the response performance and the throughput performance is prioritized based on the predetermined condition,
when the response performance is prioritized, the first storage control unit stores the data in the first and second cache areas and then performs a predetermined process,
when the throughput performance is prioritized, the first storage control unit stores the data subjected to the predetermined process in the first and second cache areas.

2. The storage system according to claim 1, wherein the predetermined process includes one of compression, deduplication, encryption, and redundancy of the data.

3. The storage system according to claim 2, wherein the predetermined process is compression of the data.

4. The storage system according to claim 1, wherein, when the throughput performance is prioritized, the first storage control unit stores the data to be subjected to the write command in a buffer area, performs a predetermined process and then stores the data in the first and second cache areas.

5. The storage system according to claim 1, wherein the first storage control unit determines that the response performance is prioritized when a processing load of the first storage control unit is lower than a predetermined reference.

6. The storage system according to claim 3,
wherein, when a compression rate of the data is predicted to be lower than a predetermined reference or when the compressed data cannot be stored in the volume designated as a data write target, the first storage control unit determines that the response performance is prioritized.

7. The storage system according to claim 1, wherein the first storage control unit stores the data read from the first cache area and subjected to the predetermined process in the buffer area.

8. The storage system according to claim 7,
wherein the first storage control unit holds a queue state indicating whether the data written in the management unit area is stored in the storage drive for each management unit area of the volume to which the data is written,
upon receiving the data write command from the host computer, the first storage control unit stores the data in the first cache area after ensuring exclusion of the management unit area to which the data is to be written,
after transmitting a response indicating an end of write of the data to the host computer, the first storage control unit cancels the exclusion of the management unit area to which the data is to be written,
after securing the exclusion of the management unit area in which the queue state indicates that the written data is not stored in the storage drive from the management unit areas, the first storage control unit reads the data written in the management unit area from the first cache area, and stores the data subjected to the predetermined process in the buffer area, and
upon completion of storage of the data that has been subjected to the predetermined process and read from the buffer area into the storage drive, the first storage control unit updates the queue state to a value indicating that the written data has been stored in the storage drive, and then cancels the exclusion of the management unit area.

9. The storage system according to claim 7,
wherein the first storage control unit holds a queue state indicating whether data written in the management unit area is stored in the storage drive for each management unit area of the volume to which the data is written and a buffer transfer state indicating whether the data written in the management unit area is stored in the buffer area,
upon receiving the data write command from the host computer, the first storage control unit stores the data in the first cache area after securing the exclusion of the management unit area to which the data is to be written,
after transmitting a response indicating the end of the data write to the host computer, the first storage control unit cancels the exclusion of the management unit area to which the data is to be written,
after securing the exclusion of the management unit area in which the queue state indicates that the written data is not stored in the storage drive from the management unit areas, the first storage control unit reads the data written in the management unit area from the first cache area, and stores the data subjected to the predetermined process in the buffer area,
the first storage control unit cancels the exclusion of the management unit area after updating the buffer transfer status of the management unit area to a value indicating that the stored data has been stored in the buffer area,
when writing the data to the management unit area while the exclusion of the management unit area is canceled, the first storage control unit updates the buffer transfer state of the management unit area to a value indicating that the written data is not stored in the buffer area,
after the data that has been subjected to the predetermined process and read from the buffer area is stored into the storage drive, the first storage control unit secures the exclusion of the management unit area, and
when the buffer transfer state of the management unit area indicates that the written data is stored in the buffer area, the first storage control unit updates the written data to a value indicating that the written data is stored in the storage drive, and then cancels the exclusion of the management unit area.

10. The storage system according to claim 7,
wherein the storage drive includes a plurality of storage drives connected to the first storage control unit, and
when the amount of data stored in the buffer area reaches a predetermined amount of data for generating parity, the first storage control unit creates the parity based on the data read from the buffer area and transmits the data read from the buffer area and the parity to the plurality of storage drives.

11. The storage system according to claim 1,
wherein the first storage control unit further includes a third cache area in which the data is stored,
the second storage control unit further includes a fourth cache area in which the data is stored,
when determining that a throughput performance is prioritized based on the predetermined condition, the first storage control unit performs the predetermined process on the data, stores the data subjected to the predetermined process in the third cache area, and transmits the data subjected to the predetermined process to the second storage control unit,
the second storage control unit stores the data that has been subjected to the predetermined process and received from the first storage control unit in the fourth cache area and performs duplication,
upon completion of storage of the data subjected to the predetermined process in the fourth cache area by the second storage control unit, the first storage control unit transmits a response indicating an end of write of the data to the host computer, and
the first storage control unit reads the data stored in the third cache area and transmits the read data to the storage drive.

12. A method of controlling a storage system, the storage system including: a first storage control unit; a second storage control unit; and a storage drive connected to at least the first storage control unit and having a nonvolatile storage medium, in which each of the first storage control unit and the second storage control unit includes a cache area in which data is stored and a buffer area in which the data is stored, and the data stored in one cache area is stored in the other cache area to perform duplication, the method comprising the steps of:
  upon receiving a data write command from a host computer, allowing the first storage control unit to store data to be subjected to the write command in a first cache area which is the cache area of the first storage control unit, and store the data in a second cache area which is the cache area of the second storage control unit to perform duplication, and upon completion of the duplication, allowing the first storage control unit to transmit a response indicating an end of write of the data to the host computer;
  allowing the first storage control unit to execute a predetermined process on the data to be subjected to the write command and transmit the data to the storage drive;
  allowing the first storage control unit to hold a predetermined condition for determining which of a response performance and a throughput performance is prioritized in the storage system and determine which of the response performance and the throughput performance is prioritized based on the predetermined condition;
  when the response performance is prioritized, allowing the first storage control unit to store the data in the first and second cache areas and then perform a predetermined process; and
  when the throughput performance is prioritized, allowing the first storage control unit to store the data subjected to the predetermined process in the first and second cache areas.

* * * * *